United States Patent [19]

Ceintrey

[11] 4,362,430
[45] Dec. 7, 1982

[54] WABOCRETE FMV

[76] Inventor: Marcel Ceintrey, Anse de Kerjegu, 29120 Combrit, France

[21] Appl. No.: 200,581

[22] Filed: Oct. 24, 1980

Related U.S. Application Data

[63] Continuation-in-part of Ser. No. 174,457, Aug. 1, 1980, abandoned.

[30] Foreign Application Priority Data

Aug. 13, 1979 [FR] France .............................. 79 21124

[51] Int. Cl.³ .............................................. E01C 11/04
[52] U.S. Cl. ......................................... 404/68; 404/64
[58] Field of Search ....................... 404/68, 69, 65, 64; 52/396, 403; 14/16.5

[56] References Cited

U.S. PATENT DOCUMENTS

| 3,570,378 | 3/1971 | Honegger | 404/69 |
| 3,626,822 | 12/1971 | Koster | 404/69 |
| 3,722,379 | 3/1973 | Koester | 404/68 |
| 3,790,294 | 2/1974 | Trieste | 404/68 |
| 3,824,025 | 7/1974 | Beutler | 404/68 X |
| 3,829,228 | 8/1974 | Miyazaki et al. | 404/68 |
| 3,918,824 | 11/1975 | Bowman | 404/65 X |
| 3,981,601 | 9/1976 | Arai | 404/68 |
| 4,111,584 | 9/1978 | Fyfe | 404/69 |
| 4,285,612 | 8/1981 | Betti | 404/68 |
| 4,290,713 | 9/1981 | Brown | 404/69 |

Primary Examiner—Nile C. Byers, Jr.
Attorney, Agent, or Firm—Cushman, Darby & Cushman

[57] ABSTRACT

An expansion joint for bridges and similar structures comprising an elastomeric sealing element, anchoring means gripping the sealing element and resin mortar connecting the anchoring means to the structure. The resin mortar is comprised of a mixture of ureide and epoxy resins and aggregate. The anchoring means has rods embedded in the resin mortar to distribute stresses therein.

12 Claims, 2 Drawing Figures

WABOCRETE FMV

This is a continuation-in-part of prior U.S. application Ser. No. 174,457 filed Aug. 1, 1980, now abandoned.

The present invention relates to an expansion joint and more particularly to the use of a resinous composition and mechanical anchorage means for fixing of a sealing element to a structure such as a roadway or a bridge deck. The new joint is suitable for joint movement ratings of 2 to 8 centimeters. In temperate climates, this will allow use of the joints for spans of 25 to 300 meters.

BACKGROUND OF THE INVENTION

An expansion joint is a small bridge over an expansion gap which is provided between a bridge abutment and a bridge deck, or between two segments of the bridge deck; the small bridge extends beyond the edges of the expansion gap. The expansion gap has a width which changes with the temperature of the structure, and the small bridge of the expansion joint is constructed to adjust its width to accommodate the variations in the width of the gap. The allowable variations in the width of the expansion joint will be referred to herein as its movement rating.

The edges of the upper surfaces of the bridge deck, abutment, or other roadway segments are not always in the same horizontal plane, and they can vary as traffic moves over the structure. These variations can be 0.5 cm or more.

The expansion joint and its anchorage should be constructed to adapt to these conditions, and to resist the effects of traffic, particularly that of heavy vehicles, which are especially destructive when the top of the expansion joint is set at the same level as the roadway.

Various types of expansion joints have been used or proposed. They can be summarized as follows:

The components constituting the mini-bridge can be either a sliding metal element, for example, in a finger joint or a sliding plate joint, or an elastomer joint, or an elastomer honeycomb joint.

The various sliding elements or elements of variable width are fastened either directly or by metal elements, to the roadway of a bridge or to an abutment.

The anchorage itself generally comprises metal bolts fixed in the concrete of the roadway, or rods buried in the concrete. This involves long and delicate work because of the tolerances on the order of millimeters may be required in concrete work, and it is burdensome because of the small amounts of material used at the time of installation of the joint in a previously constructed concrete roadway.

It has been proposed to use thermosetting resins to remedy these drawbacks. For example, it is known to use thermosetting resins to anchor the bolts in concrete. Others have used thermosetting resins to make the edges of the joint, to avoid their erosion by traffic. Also, others have made more advanced proposals such as in French Pat. No. 71/43,203, in which a joint comprising metal slides is simply glued to the roadway structures using resins; this eliminates the need for concrete when joints are installed in a previously-constructed roadway, and thus the problem of supplying small amounts of concrete at the site at that time and the problems caused by slow setting of concrete.

The last-mentioned joint does indeed eliminate fatigue problems. On the other hand, problems arise because of the difference between the expansion coefficients of the resin and concrete, that of the resin being about 10 times higher. Mortar composed of about 20% by weight of resin and 80% aggregate are less of a problem in this respect. However, they nevertheless have coefficients of expansion three to five times higher than that of concrete in the roadway. During temperature variations, these differences lead to stresses at the concrete/resin mortar interface. Since concrete is the more fragile material, it generally cannot support these stresses. These generally produce transverse fissures, and ultimately tearing away of the surface part of the roadway concrete.

SUMMARY OF THE INVENTION

The main object of the present invention is to remedy these problems while preserving the advantages of using resin mortar in sealing the joint. This object was achieved by two means that constitute basic elements of this invention. These means are directed at eliminating the effects of the difference in coefficients of expansion by reducing, on the one hand, the level of stress at the interface between resin and concrete, and, on the other hand, by avoiding the concentration of these stresses at particular points. In known installations which use epoxy resins, the concentration of stresses is reflected by the appearance of transverse fissures.

In accordance with the present invention, these results are achieved by means of an anchorage employed with an expandable element. The anchorage includes a gripping element which is attached securely to the expandable element, and the gripping element in turn anchors the expandable element to the resin mortar which is on or in the roadway. The expandable element is an elastomeric sealing element and it can be attached to the gripping element by various means well-known to those skilled in this art. For example, a mechanical interlock can be formed by wedging a part of the elastomeric sealing element in a grooved component attached to the gripping element, and/or vice versa. The elastomeric sealing element also may be bonded by adhesive, with or without mechanical interlock, although a mechanical interlock is preferred.

The gripping element preferably is flat on the side opposite the sealing element, and may be provided with one or more anchoring rods on that side. In the preferred form, the anchorage includes one or more sinusoids of rods, such as concrete reinforcing rods, of diameter about 6 to 12 mm. The rods extend lengthwise along the gripping element, generally parallel to the horizontal surface of the roadway so as to distribute stresses along the length of the body of resin mortar. They preferably are wound into a sinusoidal or spiral shape, and welded to the surface of the gripping element opposite the elastomeric sealing element at a succession of points. Therefore, the rods are buried in the resin mortar. The rods are cleaned, for example with abrasives, and coated with an organic material which adheres to the resin mortar, e.g., an epoxy paint. Preferably the gripping element is flat, e.g., one side of a flat plate, on the side opposite the expandable element, and the rods are welded to that flat surface.

These rods serve an important function in eliminating transverse fissures by avoiding concentrations of stresses due to differences in expansion between concrete and resin mortar. The reason for this effect may be associated with the fact that the expansion coefficient of steel is close to that of concrete. Therefore, a considerable part of the stresses arising from the difference in coefficients of expansion between the resin mortar and the concrete can be absorbed by the reinforcement rods, and distributed by it into the resin mortar.

A further feature of the invention is the selection of a specific category of thermosetting resin, in the resin mortar, which exhibits a great elasticity, even at low temperatures, less than −10° C., while retaining good tensile strength at normal ambient temperatures such as 20° to 40° C. In contrast, epoxy resins, which have desirable features such as good adherence to concrete and easy use, become fragile and brittle at low temperatures. The modulus of elasticity of a mortar obtained from epoxy resins is high at low temperatures, which results in unacceptable stresses at the interface of the road concrete and the mortar. Plasticizers and diluents can be added to epoxy resins to minimize this problem, but the resistance of the resulting binder is then insufficient to assure sealing.

Polyurethanes retain elasticity at low temperatures, and therefore, offer the potential of giving best results from this standpoint. Unfortunately, their sensitivity to moisture, both during installation and later during the life of the joint, make their use essentially impossible at a site exposed to the weather.

In accordance with the present invention, a resin mortar is employed which contains a complex base resin containing two components and also a granular filler such as gravel or crushed stone. Great flexibility is achieved even at temperatures as low as −20° C. The resin is polymerizable at ambient temperatures. It exhibits both the elasticity of polyurethanes and the ease of use of epoxy resins; on the other hand, it avoids the disadvantages of both of these resins. The base resin which makes up the essential part of the binder or sealing mortar is made up essentially of a mixture of polyureides and epoxy resin, in proportions of 45–80% polyureide and 20–55% epoxy resin; to which may be added diluents and plasticizers to reduce the cost and adjust the physical characteristics.

The base resin is made at the time of installing the joints by forming a liquid mixture which is poured into place and allowed to harden. The liquid mixture is made by combining two components, namely a component A and a component B.

Component A is composed of
1. A liquid epoxy resin
2. A blocked polyisocyanate
3. Optionally plasticizers and diluents to reduce viscosity.

Component B is composed primarily of an aliphatic or cycloaliphatic primary or secondary amine which will induce curing of the resin mixture, preferably at ambient or slightly elevated temperature.

BRIEF DESCRIPTION OF FIGURES OF DRAWING

DETAILED DESCRIPTION OF PREFERRED EMBODIMENTS

Figure 1:
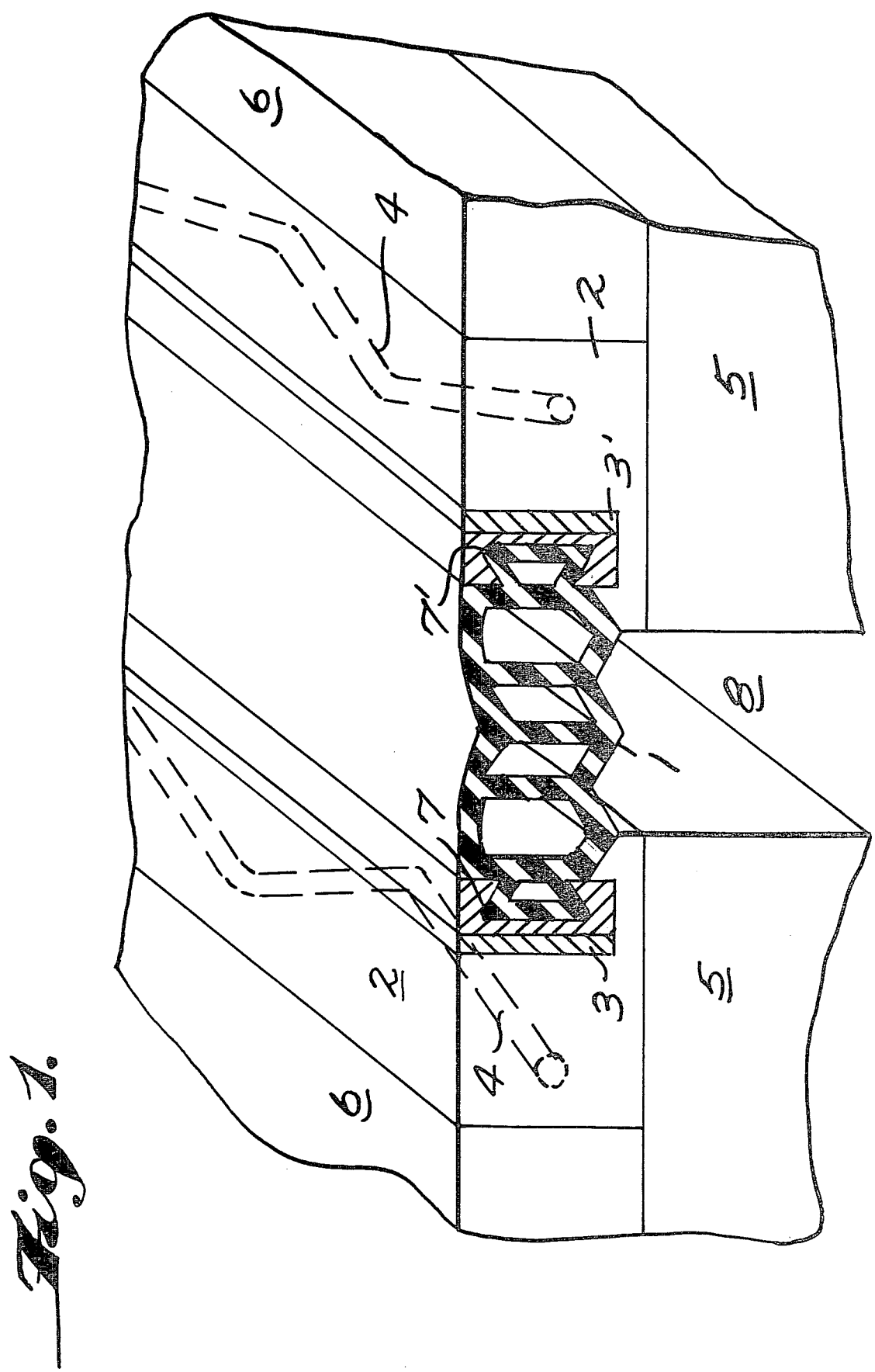
FIG. 1 illustrates an expansion joint in accordance with the invention, in perspective and partially in cross-section.

The expansion joint illustrated in FIG. 1 comprises an expandable sealing element 1 and an anchorage comprised of steel gripping elements 3 and $3^1$ and a resin mortar 2. The resin mortar rests on a concrete roadway 5 which is covered with an asphalt overlay 6, to the same level as the resin mortar 2.

The expandable sealing element 1 may be composed of a neoprene rubber composition which withstands low temperatures, and it may have the cross-section shown. Alternatively, it may have a variety of other cross-sections such as an upstanding arch or descending arch, or still others, such as those illustrated in the textbook "Expansion Joints in Bridges & Roads" by Waldemar Koster (1969).

At the sides of the expandable element there are wings 7 and $7^1$ which are held by the gripping elements 3 and $3^1$. Numerous constructions for these components may be used, such as those illustrated in U.S. Pat. Nos. 3,626,822, 3,570,378 and 4,111,584, the disclosures of which incorporated herein by reference.

The gripping elements 3 and $3^1$ are illustrated with a top which is level with the roadway and a lower portion which rests on a layer of resin mortar. However, these are not essential requirements. For example, the gripping elements can rest directly on the concrete or be covered with a layer of resin mortar. It is desirable to have the gripping element at the level of the roadway to provide a metal edge of the expansion gap 8, to protect the area which is struck forcefully by the wheels of vehicles which travel over the joint.

The gripping elements preferably have a flat surface 9 opposite from the expandable element 1. To this surface there is welded a steel rod 4 which has been formed into a spiral extending generally along the length of the gripping element. It will be understood that the steel rod may have a different shape, for example, a zig-zag shape. Also, one can use several straight rods, welded to the surface 9 at one end, and extending obliquely away from that surface, but generally along the length of the gripping element so as to distribute stresses lengthwise between the resin mortar and the gripping element.

Figure 2:
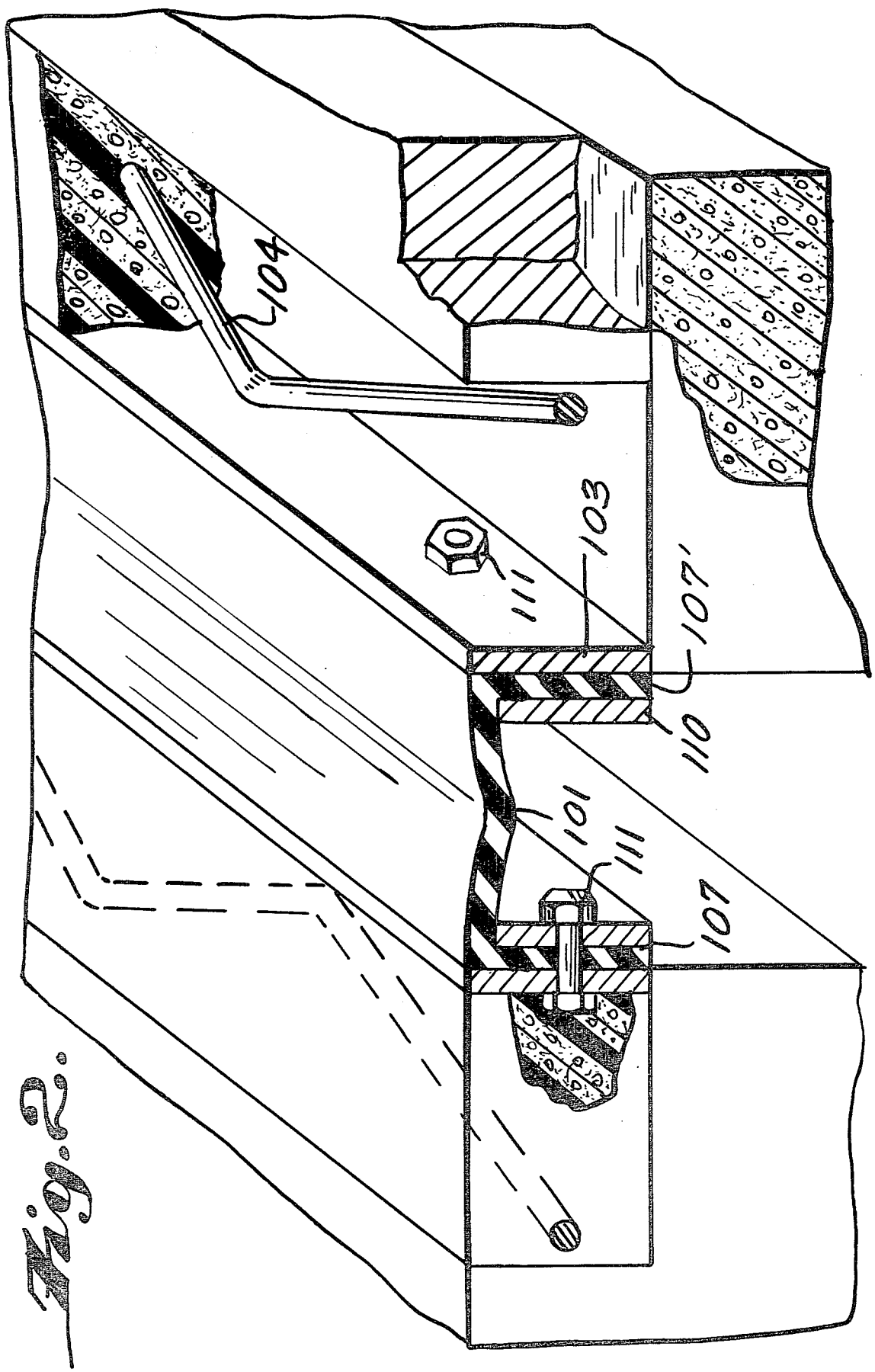
FIG. 2 illustrates another embodiment of an expansion joint, in accordance with the invention, in perspective and partially in cross-section.

FIG. 2 illustrates another embodiment. In this case, the sealing element 101 is a depending arch and the wings 107 and 107' are held between two plates 103 and 110 which comprise the gripping elements. A bolt 111 connects the plates 103 and 110 to hold the wing 107. The steel rod 104 is of zig-zag shape.

The resin mortar comprises a coarse filler such as crushed stone and a resin composition made from Components A and B. Component A in turn is composed of two low molecular weight prepolymers, that is, a liquid epoxy resin and a polyisocyanate. The resin mortar comprises 15 to 45% by weight resin and 55 to 80% by weight of course aggregates and filler, preferably 15 to 25% by weight of resins and 75 to 85% by weight course aggregate and filler, the proportions being chosen to give a flowable liquid mortar.

The liquid epoxy resin may in principle be of any type. Preferably it is a condensate of epichlorohydrin and a bis phenol. Particularly useful are those resins made from a mixture of bis phenol A and bis phenol F, as these will tend to provide a lower viscosity product. The epoxy equivalent weight of such a polymer is preferably of the order of 180–200. Typical commercial epoxy resins which may be used are Epikote 828, Shell DX 214, Versamidle 140 of Schering and Dow DER 74.75.

The polyisocyanate constituent is a blocked polyisocyanate which may be a prepolymer of a simple polyisocyanate with a polyether. The polyisocyanate constituent is selected so that, in unblocked form, it contains about 2-6% free isocyanate groups. It may be made from a simple polyisocyanate such as tolylene diisocyanate, diphenyl methane diisocyanate, or mixtures of the latter with low molecular weight polyphenylene polymethylene polyisocyanates known as crude MDI or PAPI. The polyether preferably is polyoxypropylene glycol, polyoxybutylene glycol or a copolymer of propylene oxide and/or butylene oxide with ethylene oxide. Polyoxyethylene glycols themselves tend to impart moisture sensitivity to the composition and therefore are less suitable. Polymers of propylene oxide or butylene oxide with a triol or higher polyol is less desirable because they tend to increase viscosity, although a small amount may be present. Molecular weights of 600 to 2500 are suitable for the polyether. It is possible also to employ polyesters to make the polyisocyanate constituent. However, such materials tend to be more sensitive to moisture and therefore are less desirable. The proportions of simple polyisocyanate and polyether are chosen so that the polyisocyanate prepolymer contains about 2-6% free isocyanate groups. Also, the constituents should be selected for low viscosity, preferably in the range of 20,000 to 150,000 centipoises at 20° C.

The polyisocyanate prepolymer is employed with the isocyanate groups blocked with a phenol in known manner. Suitable phenols include phenol, cresols, tertiary butyl phenol and nonyl phenol.

Component A may also include a small amount of plasticizer and/or diluent. Examples of such materials include butyl phthalate, octyl phthalate, the Shell aromatic plasticizer Dutrex and others. These materials are added to reduce viscosity, but, if used in excess, may permanently soften the product.

The proportions of the respective constituents of component A may be as follows:
20 to 50 parts liquid epoxy resin
50 to 80 parts blocked polyisocyanate prepolymer
3 to 20% of the resin portion of the resin mortar of plasticizer or diluent, if that constituent is used.

Component B contains, as its essential ingredient, an aliphatic or cycloaliphatic polyamine comprised of primary or secondary amine groups. This constituent should be chosen to unblock the polyisocyanate constituent, and to react with it to form polyureide while at the same time curing the epoxy resin, at room temperature or at slightly elevated temperature which can be created at the job site. Suitable polyamines include trimethylhexamethylene diamine, aminoethylpiperazine, bis-aminocyclohexylmethane and 3,3'-dimethyl 4,4' diaminodicyclohexylmethane.

The polyamine is used in amounts which are approximately stoichiometric with the total of reactive groups in the epoxy resin and the polyisocyanate prepolymer. This generally requires about 7 to 20% of the total weight of epoxy resin and polyureide which is formed.

Component B may also contain diluents which reduce the cost of the binder and reduce viscosity at the time the components are mixed. Diluents also improve the wetting of the coarse aggregates and the concrete roadway. Preferred diluents are coal tar pitch of viscosity between 10 and 40 EVT, or coumarone or coumarone indene resins such as that sold under the name Nacirea EPXL by Cindu Neuville Chimie, or others. Diluents which react with the constituents of component A may also be used.

Such diluents generally are added to Component B at a rate of 10% to 100% of the total of epoxy resin and polyureide to be formed with the use of such diluents.

The coarse aggregate may be gravel, coarse stone, or the like. For example, it may have a standard continuous particle size distribution curve between 0.08 and 15 mm. having 30-65% which passes a 2 mm. screen, 12-15% passing an 0.08 mm. screen and 100% passing a 15 mm. screen.

Installation of the joint according to the invention is rather simple. The sealing element 1 and the metal components of the anchorage may be fabricated at a factory and delivered at a site. Ledges are provided in the concrete roadway as shown in the drawing, and the concrete is cleaned and free of any debris. The assembly of sealing element and anchorage components is set into place on the ledges and the width of the joint is set in conventional fashion. Components A and B are combined and mixed with the coarse aggregate, although the latter may previously be combined with one of the resin components. Then the resin mortar is poured into place where it adheres to the metal components and the concrete. Preferably, if an asphalt overlay is to be used, in lieu of ledges formed in the concrete, it is laid against a dam before the joint is installed, so that the resin mortar will adhere to the asphalt.

The binder for the coarse filler which is obtained from the above-described resin composition has unique qualities. These qualities can be evaluated by tensile-elongation tests, which reveal substantial improvement over a standard epoxy resin.

A typical resin composition which may be made up of 50% polyureide obtained by reaction of a tolylene diisocyanate polyether prepolymer having 3% isocyanate groups, 20% DX 214 epoxy resin, 3,3'-dimethyl-4,4'-diaminodicyclohexylmethane reacted with the prepolymer and epoxy resin in stoichiometric amount (proportion included in proportions of resins), 30% coal tar pitch of EVT 30. The properties of such a material, compared with a standard epoxy resin, are as follows:
at 20° C. elongation is:
 (a) 30-45% for the standard epoxy resin
 (b) more than 200% for the binder of the present invention.
tensile strength is:
 (a) 30 to 45 bars for the epoxy resin
 (b) about 45 bars for the binder of the present invention.
at −15° C. elongation is:
 (a) nearly 0% for the epoxy resin
 (b) greater than 100% for the binder of the present invention.
tensile strength is:
 (a) greater than 300 kg for the epoxy resin
 (b) between 100 and 150 bars for the binder of the present invention.

It can be seen that the stresses transmitted to the concrete pavement will be much less for the composition of the present invention.

A specific example of the composition is as follows:

Component A 30 parts of Dow DER 74.75 epoxy resin
70 parts of liquid isocyanate prepolymer having an average molecular weight of 2,000, containing 3% free isocyanate groups, obtained by reaction of tolylene diisocyanate on polypropylene glycol, using an excess of tolylene diisocyanate, blocked with phenol.

5 parts butyl phthalate.

Component B 15 pars 3,3'-dimethyl-4,4'-diaminodicyclo-hexylmethane 50 parts coal tar pitch of 30 EVT viscosity When Components A and B have been mixed, and they have polymerized (which polymerization can be accelerated by heating, the resin obtained has the following characteristics:

at 20° C.:
  tensile strength 40–50 bars
  elongation more than 150%
at −15° C.:
  tensile strength 100 to 150 bars
  elongation more than 100%

The mortar can be made from a mixture of 17% of this composition and 83% aggregate sized in the range 0 to 13 mm. Before polymerization, it is like a viscous paste that strongly adheres to the roadway concrete, the sides of the joint and the asphalt. The material can be tested by pouring the mixture to form a coating having a thickness of 3 mm on a slab of concrete 10×50 cm. If a series of thermal shock tests are performed between −40° C. and +20° C., neither delamination nor rupture of the concrete occurs. If standard epoxy resin is substituted for the resin of the present invention, rupture of the concrete occurs.

What is claimed is:

1. An expansion joint for a concrete roadway or the like comprising an expandable sealing element, a resin mortar comprised of coarse aggregate and a resin composition and means anchoring the expandable sealing element to the resin mortar, said resin composition comprising a mixture of epoxy resin and polyureide.

2. An elastomeric expansion joint as set forth in claim 1 in which said anchoring means comprises a generally flat surface and one or more rods extending from said flat surface in a direction generally lenthwise along the joint, said rods being embedded in said resin motar.

3. An elastomeric expansion joint as set forth in claim 2 in which said flat surface is substantially vertical and said one or more rods extend from said flat surface laterally outwardly from said expandable sealing element and generally lengthwise along the joint.

4. An elastomeric joint as set forth in claim 3 in which said one or more rods comprise a sinusoid, said sinusoid being attached to said flat surface at a plurality of points along the length of the joint.

5. An elastomeric sealing element as set forth in claim 4 in which said sinusoid is metal.

6. An expansion joint as set forth in claim 2 in which said resin mortar comprises 15 to 45% of said resin composition and 55 to 85% of said coarse aggregate.

7. An expansion joint as set forth in claim 2 in which said resin mortar comprises 15 to 25% of said resin composition and 75 to 85% of said coarse aggregate.

8. An expansion joint as set forth in claim 2 in which the coarse aggregate comprises a mixture of aggregates and sand.

9. An expansion joint as set forth in claim 2 in which said resin composition comprises 45 to 80% polyureide and 20 to 55% of epoxy resin, the percentages being based on the total of polyureide and epoxy resin.

10. An expansion joint as set forth in claim 8 in which said resin composition also contains plasticizer and/or diluent.

11. An expansion joint as set forth in claim 2 in which the resin is obtained by reaction of Component A and Component B, wherein Component A is a mixture of
  (1) a liquid polyisocyanate prepolymer containing 2 to 6% of NCO groups blocked by a phenol
  (2) an epoxy resin
and Component B comprises an aliphatic or cycloaliphatic diamine.

12. An concrete roadway having a gap thereon, and an expansion joint according to claim 1 covering over said gap, the resin mortar adhering said anchoring means to the roadway.

* * * * *